(12) United States Patent
Zhou et al.

(10) Patent No.: US 12,086,126 B2
(45) Date of Patent: Sep. 10, 2024

(54) METHOD, DEVICE AND APPARATUS FOR SPREADSHEET IMPORTING, AND MEDIUM

(71) Applicant: Beijing Zitiao Network Technology Co., Ltd., Beijing (CN)

(72) Inventors: Yuanze Zhou, Beijing (CN); Yan Liu, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/516,743

(22) Filed: Nov. 21, 2023

(65) Prior Publication Data

US 2024/0086389 A1    Mar. 14, 2024

Related U.S. Application Data

(63) Continuation of application No. PCT/CN2022/089597, filed on Apr. 27, 2022.

(30) Foreign Application Priority Data

May 21, 2021   (CN) .......................... 202110560039.9

(51) Int. Cl.
*G06F 16/22*   (2019.01)
*G06F 16/25*   (2019.01)
*G06F 40/18*   (2020.01)

(52) U.S. Cl.
CPC .......... *G06F 16/2282* (2019.01); *G06F 16/25* (2019.01); *G06F 40/18* (2020.01)

(58) Field of Classification Search
CPC ..... G06F 40/166; G06F 16/2282; G06F 40/18
(Continued)

(56) References Cited

U.S. PATENT DOCUMENTS 8,832,543 B2 * 9/2014 Broman ............... G06F 40/166
715/255
2016/0323224 A1   11/2016 Stein et al.
(Continued)

FOREIGN PATENT DOCUMENTS

CN    101127081 A    2/2008
CN    107808003 A    3/2018
(Continued)

OTHER PUBLICATIONS

Corn Beans, "POI implements data and pictures in excel to be imported into the database," Blog Post, Aug. 24, 2020, https://blog.csdn.net/yayayu_/article/details/108198874, 8 pages.
(Continued)

*Primary Examiner* — Hung T Vy
(74) *Attorney, Agent, or Firm* — Astute IP Law Group

(57) ABSTRACT

The present disclosure provides a method for spreadsheet importing, a device, an apparatus and a medium. An image processing method includes: receiving a spreadsheet to be imported; displaying, in response to that a spreadsheet object in the spreadsheet includes a picture, the picture in a target table cell of a database table. The target table cell is determined based on a cell position of a target cell; the target cell is a cell to which the picture belongs in the spreadsheet; and the cell position is determined based on a data area of the spreadsheet.

12 Claims, 7 Drawing Sheets

(58) Field of Classification Search
USPC .......................................................... 707/803
See application file for complete search history.

(56) References Cited

U.S. PATENT DOCUMENTS

2017/0123492 A1* 5/2017 Marggraff .......... G02B 27/0093
2019/0391718 A1* 12/2019 Cao ........................ G06F 9/451
2020/0320087 A1 10/2020 Tyercha et al.

FOREIGN PATENT DOCUMENTS

| CN | 108351867 A | 7/2018 |
| CN | 108701075 A | 10/2018 |
| CN | 109753641 A | 5/2019 |
| CN | 111259639 A | 6/2020 |
| CN | 111860502 A | 10/2020 |
| CN | 112131920 A | 12/2020 |
| CN | 112784551 A | 5/2021 |
| CN | 113204557 A | 8/2021 |
| WO | 2019179021 A1 | 9/2019 |

OTHER PUBLICATIONS

How do you know I can't do it if you don't give it a try?, "The database stores the image path and displays it to the front end," Blog Post, Mar. 31, 2021, https://blog.csdn.net/weixin_42700882/article/details/115350804, 5 pages.
International Search Report in PCT/CN2022/089597, mailed Jul. 6, 2022, 5 pages.
Office Action in CN202110560039.9, mailed Feb. 1, 2023, 17 pages.
Office Action in CN202110560039.9, mailed Apr. 30, 2023, 13 pages.
Office Action in CN202110560039.9, mailed Jul. 29, 2023, 12 pages.
Notification to Grant Patent Right for Invention in Chinese Patent Application No. 202110560039.9, mailed Jan. 17, 2024, 3 pages.

* cited by examiner

FIG. 9
FIG. 10
FIG. 11

METHOD, DEVICE AND APPARATUS FOR SPREADSHEET IMPORTING, AND MEDIUM

CROSS-REFERENCE TO RELATED APPLICATION

The present application is a continuation of PCT/CN2022/089597, filed on Apr. 27, 2022, which claims priority to Chinese patent Application No. 202110560039.9, filed on May 21, 2021, and titled "METHOD, DEVICE AND APPARATUS FOR SPREADSHEET IMPORTING, AND MEDIUM", which is incorporated herein by reference in its entirety.

TECHNICAL FIELD

The present disclosure relates to the technical field of data processing, and more particularly, to a method, device and apparatus for spreadsheet importing, and a medium.

BACKGROUND

In a database table product application, content of a type of spreadsheet such as Excel may need to be imported into a database table.

The spreadsheet may store a picture, and the picture may not be stored in a cell of the spreadsheet, but instead stored as an attachment, and displayed in a floating manner when being displayed and output. In this case, when the spreadsheet is imported into the database table, due to the fact that the picture does not belong to the content of the cell in the spreadsheet, the database table will directly ignore the picture, and the picture will not be imported, causing data content to be lost.

SUMMARY

In order to solve the technical problem or at least partially solve the technical problem, the present disclosure provides a method, device and apparatus for spreadsheet importing, and a medium.

In a first aspect, the present disclosure provides a method for spreadsheet importing, including:
receiving a spreadsheet to be imported; and
displaying, in response to that a spreadsheet object in the spreadsheet includes a picture, the picture in a target table cell of a database table,
wherein the target table cell is determined based on a cell position of a target cell; the target cell is a cell to which the picture belongs in the spreadsheet; and the cell position is determined based on a data area of the spreadsheet.

In a second aspect, the present disclosure provides a method for spreadsheet importing, including:
receiving a file importing request, the file importing request carrying a spreadsheet to be imported;
determining, in response to that a spreadsheet object of the spreadsheet includes a picture, a target cell to which the picture belongs, the target cell being a cell in the spreadsheet;
determining, based on a cell position of the target cell, a target table cell located in a database table, the cell position being determined based on a data area of the spreadsheet; and
storing the picture in the target table cell.

In a third aspect, the present disclosure provides a device for spreadsheet importing, including:

a first receiving unit configured to receive a spreadsheet to be imported; and
an object display unit configured to display, in response to that a spreadsheet object in the spreadsheet includes a picture, the picture in a target table cell of a database table,
wherein the target table cell is determined based on a cell position of a target cell; the target cell is a cell to which the picture belongs in the spreadsheet; and the cell position is determined based on a data area of the spreadsheet.

In a fourth aspect, the present disclosure provides a device for spreadsheet importing, including:
a second receiving unit configured to receive a file importing request, the file importing request carrying a spreadsheet to be imported;
a first determination unit configured to determine, in response to detecting that a spreadsheet object in the spreadsheet includes a picture, a target cell to which the picture belongs, the target cell being a cell in the spreadsheet;
a second determination unit configured to determine a target table cell located in a database table based on a cell position of the target cell, the cell position being determined based on a data area of the spreadsheet; and
an object storage unit configured to store the picture into the target table cell.

In a fifth aspect, the present disclosure provides a device for spreadsheet importing, including:
a processor;
a memory having an executable instruction stored thereon,
wherein the processor is configured to read the executable instruction from the memory and execute the executable instruction to implement the method for spreadsheet importing according to the first aspect or the second aspect.

In a sixth aspect, the present disclosure provides a computer readable storage medium, the storage medium has a computer program stored thereon, and when the computer program is executed by a processor, the processor is caused to implement the method for spreadsheet importing according to the first aspect or the second aspect.

Compared with the related art, the technical aspect provided by the embodiment of the present disclosure has following advantages:

The method for spreadsheet importing, the device, the apparatus, and the medium provided by the present disclosure, when the spreadsheet object in the spreadsheet includes the picture, the picture can be displayed or stored in the target table cell of the database table, so that the picture is prevented from being deleted, and data integrity after the spreadsheet data is imported into the database table can be ensured.

BRIEF DESCRIPTION OF DRAWINGS

The above and other features, advantages and aspects of the embodiments of the present disclosure will become more apparent in conjunction with the accompanying drawings and with reference to following detailed description. Throughout the drawings, the same or similar reference numerals denote the same or similar elements. It should be understood that the drawings are schematic, and components and elements are not necessarily drawn to scale.

FIG. 9 is a structural diagram of a spreadsheet to be imported according to still another embodiment of the present disclosure;

FIG. 10 is a schematic diagram of a database table displayed in yet another embodiment of the present disclosure;

FIG. 11 is a structural diagram of a spreadsheet to be imported according to still another embodiment of the present disclosure;

Figure 1:
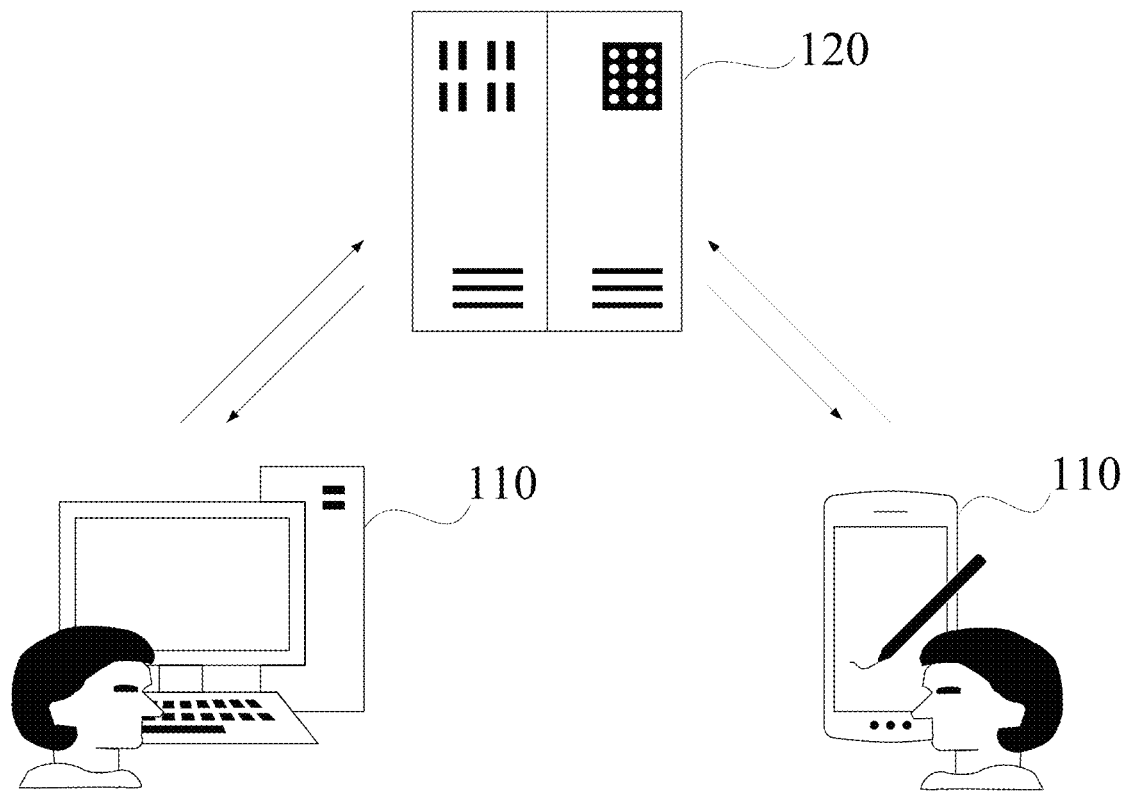
FIG. 1 is a schematic diagram of an architecture for spreadsheet importing.

110—electronic device, 120—server, 11—spreadsheet, 12—picture, 13—target cell, 14—database table, 15—target table cell, 1700—device for spreadsheet importing, 1701—first receiving unit, 1702—object display unit, 1800—device for spreadsheet importing, 1801—second receiving unit, 1802—first determination unit, 1803—second determination unit, 1804—object storage unit, 1901—processing device, 1902—ROM, 1903—RAM, 1904—bus, 1905—input-output (I/O) interface, 1906—input device, 1907—output device, 1908—storage device, 1909—communication device.

DESCRIPTION OF EMBODIMENTS

Embodiments of the present disclosure will be described in more detail below with reference to the accompanying drawings. Although certain embodiments of the present disclosure are shown in the drawings, it should be understood that the present disclosure may be implemented in various forms and should not be construed as limited to the embodiments set forth herein, but rather these embodiments are provided for thorough and complete understanding of the present disclosure. It should be understood that the drawings and embodiments of the present disclosure are only used for exemplary effects, and not intended to limit the scope of protection of the present disclosure. It should be understood that various steps described in the method embodiments of the present disclosure may be executed in different sequences, and/or executed in parallel. In addition, the method embodiments may include additional steps and/or omit the steps shown. The scope of the present disclosure is not limited in this regard.

The terms "including" and variations thereof as used herein are open ended, i.e., "including but not limited to". The term "based on" is "at least partially based on". The term "one embodiment" means "at least one embodiment"; the term "another embodiment" means "at least one further embodiment"; the term "some embodiments" means "at least some embodiments". The relevant definitions of other terms are given in following description.

It should be noted that the concepts of "first", "second" and the like mentioned in the present disclosure are only used for distinguishing different devices, modules or units, and not used for limiting the sequence or mutual dependency relationship of the functions executed by the devices, modules or units.

It should be noted that modification of "a" and "a plurality of" mentioned in the present disclosure is schematic and non-limiting, and it should be understood by a person skilled in the art that unless the context clearly indicates otherwise, it should be understood as "one or more".

Names of message or information exchanged among multiple devices in the embodiments of the present disclosure are only used for illustrative purposes, but not intended to limit the scope of these messages or information.

The present disclosure provides a method for spreadsheet importing, and the spreadsheet can be a spreadsheet for displaying a picture in a floating mode, such as an Excel spreadsheet, an Access spreadsheet or a WPS spreadsheet and the like. Hereinafter, by taking a case where the spreadsheet is an Excel file as an example, an architecture of the method for spreadsheet importing involved in the embodiment of the present disclosure and a use scenario of the related technology will be explained.

FIG. 1 is a schematic diagram of an architecture for spreadsheet importing. As shown in FIG. 1, the architecture for spreadsheet importing can include at least one electronic device 110 located at a client and a server 120 located at a server side, and the server 120 establishes a communication connection with the electronic device 110 to perform information interaction.

In practical application, the electronic device can be a mobile phone, a spreadsheet computer, a desktop computer, an all-in-one machine, vehicle-mounted equipment, wearable equipment and the like; the server can be a cloud server and a server cluster, and the server should be a server having a database processing function.

On the basis of the architecture, after a user imports the spreadsheet in the Excel format at the electronic device 110 side, the electronic device sends the spreadsheet to the server 120, after receiving the spreadsheet, the server 120 generates a new database table according to the spreadsheet, and feeds back the database table to the electronic device 110; and after receiving the database table fed back by the server 120, the electronic device 110 displays an output database table at an output interface.

In another application of the present disclosure, the importing architecture of the spreadsheet can only include one terminal device; and after the user imports the spreadsheet in the Excel format to the terminal, the terminal directly processes the spreadsheet to generate a new database table, displays and outputs the generated database table.

Due to the fact that the spreadsheet of this type has a picture independent of a spreadsheet area, in a conventional application, when spreadsheet data is imported into the database table, a picture image stored therein is directly deleted; and when the user stores the picture image when making the spreadsheet, the picture is used as a part of the spreadsheet data, and if the picture is directly deleted, data stored in the spreadsheet data will be lost.

In order to solve the above problem, the embodiment of the present disclosure provides a method for spreadsheet importing, a device, an apparatus, and a medium, which are used for importing a picture into a target table cell in the database table when there is the picture in the spreadsheet, so that the picture is prevented from being deleted.

Figure 2:
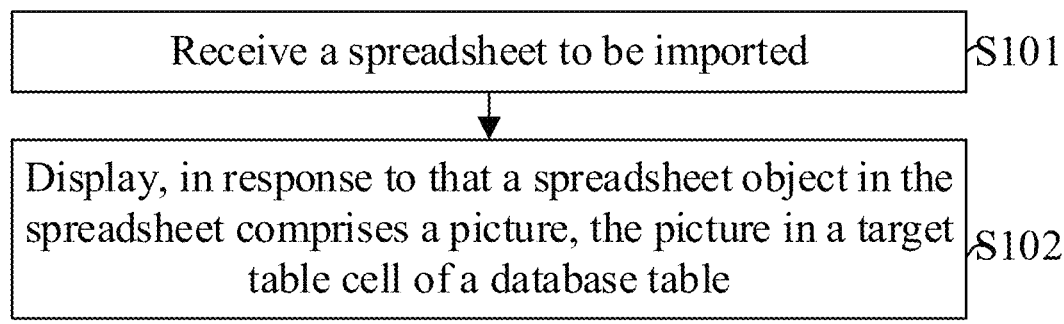
FIG. 2 is a flowchart of a method for spreadsheet importing according to an embodiment of the present disclosure.

FIG. 2 is a flowchart of a method for spreadsheet importing according to an embodiment of the present disclosure; in some embodiments of the embodiments of the present disclosure, the method for spreadsheet importing shown in FIG. 2 is executed by the electronic device in FIG. 1.

As shown in FIG. 2, the method for spreadsheet importing includes steps S101-S102.

At S101, a spreadsheet to be imported is received.

In the embodiment of the present disclosure, the electronic device can receive the spreadsheet imported by the user in a specific application program. Specifically, the electronic device can receive a spreadsheet file selected by the user in a file directory, and it can also receive some areas selected by the user in the spreadsheet after the user opens the spreadsheet in a certain application program.

At S102, in response to that a spreadsheet object in the spreadsheet includes a picture, the picture is displayed in a target table cell of a database table.

In practical application, the spreadsheet object in the spreadsheet can be various object types such as pictures, numerical objects and text objects.

The numerical objects, the text objects and the like can be directly stored in a data area of the spreadsheet cell, and when the spreadsheet is displayed and output, the numerical objects or the text objects can be directly displayed and output. The picture can be stored as an attachment of the spreadsheet, a position of the spreadsheet relative to the cell is stored in the spreadsheet, and when the spreadsheet is displayed and output, the picture is displayed above the cell in a floating mode according to a stored position.

In the step S102, if the spreadsheet object in the spreadsheet includes the picture, the picture will be retained when being imported into the database table, so that the picture is stored in the target table cell of the database table, and it is displayed and output in the target table cell.

The target table cell in the embodiment of the present disclosure can be determined according to a cell position of the target cell, while the target cell is a cell to which the picture belongs in the spreadsheet. That is, in the step S102, based on the cell to which the picture of the spreadsheet belongs, a target table cell corresponding to the target cell in the database table is determined, and then the picture is displayed in the display area defined by the target table cell.

In the embodiment of the present disclosure, the cell position of the target cell can be determined according to the data area of the spreadsheet, while the data area of the spreadsheet is an area where row and column content is stored in the spreadsheet. Specifically, how to determine the cell position of the target cell according to the data area can refer to a specific example description below.

In the embodiment of the present disclosure, after the electronic device 110 receives the imported spreadsheet, it sends the spreadsheet to a server and receives the database table fed back by the server. The server in the embodiment of the present disclosure is the server 120 shown in FIG. 1.

By adopting the method for spreadsheet importing provided by the embodiment of the present disclosure, when the spreadsheet object in the spreadsheet includes the picture, the picture is displayed in the target table cell of the database table, thereby preventing the picture from being deleted, and ensuring data integrity after the spreadsheet data is imported into the database table.

The method for spreadsheet importing provided by the embodiment of the present disclosure is specifically analyzed in combination with position conditions of various pictures appearing in the spreadsheet.

Figure 3:
FIG. 3 is a structural diagram of a spreadsheet to be imported according to an embodiment of the present disclosure.

FIG. 3 is a structural diagram of a spreadsheet to be imported according to an embodiment of the present disclosure. As shown in FIG. 3, in one embodiment of the present disclosure, the data area of the spreadsheet to be imported 11 is an area having data content in rows and columns in the figure (in particular, a rectangular area defined by a thick, solid line in the figure). As shown in FIG. 3, in the present embodiment, the spreadsheet object of the spreadsheet 11 includes a picture 12, and the picture 12 is located in the data area of the spreadsheet 11 and specifically located in an area range of the second column of the spreadsheet 11.

The first picture 12 correspondingly shown at an upper left corner in FIG. 3 is located in the second row and the second column of the data area of the spreadsheet 11, and from the perspective of display, a cell to which it belongs is a cell label with the second row and the second column in the data area of the spreadsheet 11, that is, the target cell 13 corresponding thereto is a cell with a row position being 2 and a column position being 2 (both the row position and the column position are cell positions).

In the embodiment of the present disclosure, in response to that the target cell is located in the data area, the target table cell is located at the cell position in the database table.

Figure 4:
FIG. 4 is a schematic diagram of a database table displayed in an embodiment of the present disclosure.

FIG. 4 is a schematic diagram of a database table displayed in an embodiment of the present disclosure, and the database table 14 in FIG. 4 is the database table 14 generated and displayed based on the spreadsheet 11 provided in FIG. 3. As shown in FIG. 4, according to the cell position of the target cell 13, it is determined that the target table cell 15 is a cell with the row position being 2 and the column position being 2 in the database table 14. After the position of the target table cell 15 is determined, the picture 12 belonging to the target cell 13 located at the second row and the second column in the spreadsheet 11 is displayed and output in the second row and the second column in the database table 14.

That is, in the embodiment shown in FIG. 3 and FIG. 4, in response to that the target cell 13 is located in the data area, the target table cell 15 is also located in cell in the database table 14.

Figure 5:
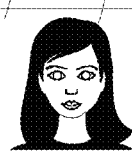
FIG. 5 is a structural diagram of a spreadsheet to be imported according to another embodiment of the present disclosure.

FIG. 5 is a structural diagram of a spreadsheet to be imported according to another embodiment of the present disclosure. As shown in FIG. 5, in another embodiment of the present disclosure, a data area of a spreadsheet 11 to be imported is an area having data content in rows and columns in the graph (specifically, a rectangular area defined by a thick, solid line in the figure).

As shown in FIG. 5, in the embodiment, the spreadsheet object of the spreadsheet 11 includes a picture 12, and the picture 12 is located on a left side of the data area of the spreadsheet 11. In the embodiment of the present disclosure, a cell located at the upper left corner in the data area of the spreadsheet 11 is identified as a cell in the first row and the first column, the number of the row is gradually increased from top to bottom, the number of the column is gradually increased from left to right, and the data area of the spreadsheet 11 includes five rows and four columns. According to this rule, the cell position of the target cell 13 where the picture 12 is located is the second row and the first column, and the target cell 13 where the picture 12 is located is located on an outer side of the data area.

In the embodiment of the present disclosure, a display strategy of the database table is that under the condition that the target cell 13 is located on a left side or a right side of the data area, the target table cell is located at a target row position in a newly added column in the database table, and the target row position is a row position in the cell position.

Figure 6:
FIG. 6 is a schematic diagram of a database table displayed in another embodiment of the present disclosure.

FIG. 6 is a schematic diagram of a database table displayed in another embodiment of the present disclosure. The database table 14 in FIG. 6 is the database table 14 generated and displayed based on the spreadsheet 11 provided in FIG. 5. As shown in FIG. 6, and first 4 columns in the database table 14 are generated according to the data area of the spreadsheet 11. In addition, a newly added column is added to the database table 14, and the newly added column is the fifth column located on the right side. According to the display strategy of the previous paragraph, since the cell position of the target cell 13 is that the row position is 2 and the column position is −1, it is determined that the target table cell 15 is the second row in the newly added column (the second row position is the target row position mentioned above).

After the position of the target table cell 15 is determined, the picture 12 belonging to the target cell 13 with the row being 1 and the column being −1 in the spreadsheet 11 is displayed and output in the second row and the fifth column in the database table 14.

In the embodiment of the present disclosure, the newly added column is located on the rightmost side of the database table. In other embodiments, the newly added column can also be arranged on a leftmost side of the database table according to a setting mode in the spreadsheet. In some special cases, the electronic device can also provide a user setting interface, for the user to determine a relative position of the newly added column relative to each column of the data area in the spreadsheet 11.

Figure 7:
FIG. 7 is a structural diagram of a spreadsheet to be imported according to still another embodiment of the present disclosure.

FIG. 7 is a structural diagram of a spreadsheet to be imported provided by still another embodiment of the present disclosure. As shown in FIG. 7, in yet another embodiment of the present disclosure, the data area of the spreadsheet 11 to be imported is an area having data content in rows and columns in the graph (specifically, a rectangular area defined by a thick, solid line in the figure). As shown in FIG. 7, in the present embodiment, the spreadsheet object of the spreadsheet 11 includes a picture 12, and the picture 12 is located on a lower side of the data area of the spreadsheet 11.

In the embodiment of the present disclosure, the cell located at the upper left corner in the data area of the spreadsheet 11 is identified as the cell of the first row and the first column, the number of rows is gradually increased from top to bottom, the number of columns is gradually increased from left to right, and the data area of the spreadsheet 11 includes 5 rows and 4 columns. According to this rule, the cell position of the target cell 13 where the picture 12 is located is the sixth row and the second column, and the target cell 13 where the picture 12 is located is on the outer side of the data area.

In the embodiment of the present disclosure, a display strategy of the database table is that when the target cell 13 is located above or below the data area, the target table cell is located at the target column position in the newly added row in the database table, and the target column position is the column position in the cell position.

Figure 8:
FIG. 8 is a schematic diagram of a database table displayed in yet another embodiment of the present disclosure.

FIG. 8 is a schematic diagram of a database table displayed in yet another embodiment of the present disclosure, and the database table 14 of FIG. 8 is a database table 14 generated and displayed based on the spreadsheet 11 provided in FIG. 6. As shown in FIG. 8, the first 5 rows in the database table 14 are generated according to the data area of the spreadsheet 11. In addition, a newly added row is added to the database table 14, and the newly added row is the sixth row located at the lowermost side. According to the display strategy of the previous paragraph, based on the cell position of the target cell 13, it is determined that the target table cell 15 is a cell with the row position being 6 and the column position being 2 in the database table 14.

After the position of the target table cell 15 is determined, the picture 12 belonging to the target cell 13 located at the sixth row and the second column in the spreadsheet 11 is displayed and output in the sixth row and the second column in the database table 14.

In the embodiment of the present disclosure, the newly added row is located on the lowermost side of the database table. In other embodiments, if the target cell is located on the upper side of the data area of the spreadsheet, the newly added row can also be arranged on an uppermost side row of the database table according to the setting mode in the spreadsheet; under some special conditions, the electronic device can also provide a user setting interface, for the user to determine a relative position of the newly added row relative to each row of the data area in the spreadsheet.

FIG. 9 is a structural diagram of a spreadsheet to be imported according to still another embodiment of the present disclosure. As shown in FIG. 9, in still another embodiment of the present disclosure, the data area of the spreadsheet 11 to be imported is an area having data content in rows and columns in the figure (specifically, a rectangular area defined by a thick, solid line in the figure).

As shown in FIG. 9, in the embodiment, the spreadsheet object of the spreadsheet 11 includes a picture 12, and the picture 12 is located on a lower right side of the data area of the spreadsheet 11. In the embodiment of the present disclosure, a cell located at the upper left corner in the data area of the spreadsheet 11 are identified as a cell in the first row and the first column, the number of rows is gradually increased from top to bottom, the number of columns is gradually increased from left to right, and the data area of the spreadsheet 11 includes five rows and four columns. According to this rule, a cell position of the target cell 13 where the picture 12 is located is the sixth row and the fifth column, and the target cell 13 where the picture 12 is located is located on an outer side of the data area.

In the embodiment of the present disclosure, when the target cell is located at a one-phase row-column position of a left upper side or a right lower side of the data area, the target table cell is located on the correspondingly newly added row and column position of the database table.

FIG. 10 is a schematic diagram of a database table displayed according to still another embodiment of the present disclosure, and the database table 14 of FIG. 10 is a database table 14 generated and displayed based on the spreadsheet 11 provided in FIG. 9. As shown in FIG. 10, the first five rows and the first four columns in the database table 14 are generated according to the data area of the spreadsheet 11. In addition, a newly added row and a newly added column are added to the database table 14, and the newly added row is located on the sixth row on the lowermost side, and the newly added column is the fifth column located on the rightmost side.

According to the cell position of the target cell 13, it is determined that the target table cell 15 is a cell with the row position being 6 and the column position being 5 in the database table 14. After the position of the target table cell 15 is determined, the picture 12 belonging to the target cell 13 locate at the sixth row and the fifth column in the spreadsheet 11 is displayed and output in the sixth row and the fifth column in the database table 14.

In various embodiments of the present disclosure, the picture 12 is located in the area determined by one cell of the spreadsheet 11 to be imported, so that the cell can be directly used as the target cell 13 to which the picture 12 belongs. In other embodiments of the present disclosure, the picture 12 may span an area determined by a plurality of cells of the spreadsheet 11 to be imported, and in this case, a cell needs to be selected as the target cell 13 from the plurality of spreadsheets 11 covered by the picture 12.

FIG. 11 is a structural diagram of a spreadsheet to be imported according to still another embodiment of the present disclosure. As shown in FIG. 11, in still another embodiment of the present disclosure, the picture 12 covers two cells in the spreadsheet 11, and the two cells are cells with the cell positions being the second row and the second column, the second row and the third column respectively in the data area. In this case, one cell needs to be determined in the two cells as the target cell 13, and the target table cell 15 in the database table 14 is determined based on this target cell 13.

In the embodiment of the present disclosure, in response to that the picture covers a plurality of cells, one cell is selected to serve as the target cell from the cells covered by the picture.

Figure 12:
FIG. 12 is a schematic diagram of a database table displayed in yet another embodiment of the present disclosure.

FIG. 12 is a schematic diagram of a database table displayed in yet another embodiment of the present disclosure. The database table 14 of FIG. 12 is a database table 14 generated and displayed based on the spreadsheet 11 provided in FIG. 11.

As shown in FIG. 12, in the embodiment of the present disclosure, the target table cell 15 is a cell at the second row and the second column in the database table 14, that is, the target cell 13 is selected as a cell at the second row and the second column in the spreadsheet 11. In the embodiments of the present disclosure, selection of the position of the target cell 13 may be based on a reference point in the picture 12 (for example, an upper left corner point of the picture 12), or based on a proportion of the picture 12 in each cell (specifically, if the proportion of the picture cell in a certain cell is the maximum, this cell is used as the target cell 13).

In some applications of the embodiment of the present disclosure, in addition to be determined according to the cell position of the target cell 13, the target table cell 15 further needs to be determined according to an object type of the spreadsheet object stored in a target cell group. The target cell group is a cell group to which the target cell 13 belongs. In practical application, the target cell group can be a certain row in the spreadsheet 11, and it can also be a certain column in the spreadsheet, or a set composed of several continuous rows or column cells selected by the user.

In one embodiment of the present disclosure, if the object types in a certain target cell group are all picture types, the target table cell is determined only according to the cell position.

Specifically, with reference to FIG. 3 to FIG. 4, in the cell shown in FIG. 3, the cell group of the target cell 13 is the second column. After checking all cells in the second column in the spreadsheet 11 to determine that the cell group only stores the picture 12 and does not store other objects, the target table cell 15 can be determined only according to the cell position. In the embodiments of FIG. 3 and FIG. 4, it is determined that the target table cell 15 is a cell with a row position being 2 and a column position being 2 in the database table 14.

In one embodiment of the present disclosure, if the object type includes other object types than the picture type, then the target table cell is located at a target position in a newly added cell group in the database table, the newly added cell group is determined according to a cell group attribute of the target cell group, and the target position is determined according to the cell position.

Figure 13:
FIG. 13 is a structural diagram of a spreadsheet to be imported according to still another embodiment of the present disclosure.

FIG. 13 is a structural diagram of a spreadsheet to be imported according to still another embodiment of the present disclosure. As shown in FIG. 13, in still another embodiment of the present disclosure, the data area is 5 rows and 4 columns, and the picture 12 is located in the second row and the second column of the data area, that is, the target cell 13 is the second row and the second column of the data area.

While the cell group corresponding to the target cell 13 is the second column, and continuing to check the object displayed in the second column, it can be determined that in addition to displaying the picture 12 in the second row and the second column, a text object is displayed in both the third row and the second column, and the fourth row and the second column. That is, in this case, the second column includes two types of objects. If importing of the object into the database table 14 continues according to the above rule, then the second column in the database table 14 will simultaneously store the text object and the picture 12, causing data attributes of the column of objects to be different.

In the embodiment of the present disclosure, in response to that the object type of the target cell group includes other object types than the picture type, the target table cell is located at the target position in the newly added unit group in the database table. The newly added unit group is determined according to the unit group attribute of the target cell group, and the target position is determined according to the unit position. In order to avoid the problem in the previous paragraph, in the embodiment of the present disclosure, if the cell group including the picture 12 in the spreadsheet 11 further includes other object types, then a cell group is newly added in the database table 14, and the target cell 13 group is arranged at a target position of the newly added cell group.

Figure 14:
FIG. 14 is a schematic diagram of a database table displayed in yet another embodiment of the present disclosure.

FIG. 14 is a schematic diagram of a database table displayed in yet another embodiment of the present disclosure. The database table 14 of FIG. 14 is a database table 14 generated and displayed based on the spreadsheet 11 provided in FIG. 13. As shown in FIG. 14, in order to avoid storing the picture 12 in the second column and causing the second column to simultaneously store the text object and the picture 12, in the embodiment of the present disclosure, on the basis of importing the 5 rows and 4 columns in the spreadsheet 11 into the database table 14, a column (i.e., the fifth column) is newly added to the database table 14, and the picture 12 in the second column and the second column of the spreadsheet 11 is stored in the second row and the fifth column. That is, the target table cell 15 is located in the second row and the fifth column of the database table 14.

Figure 15:
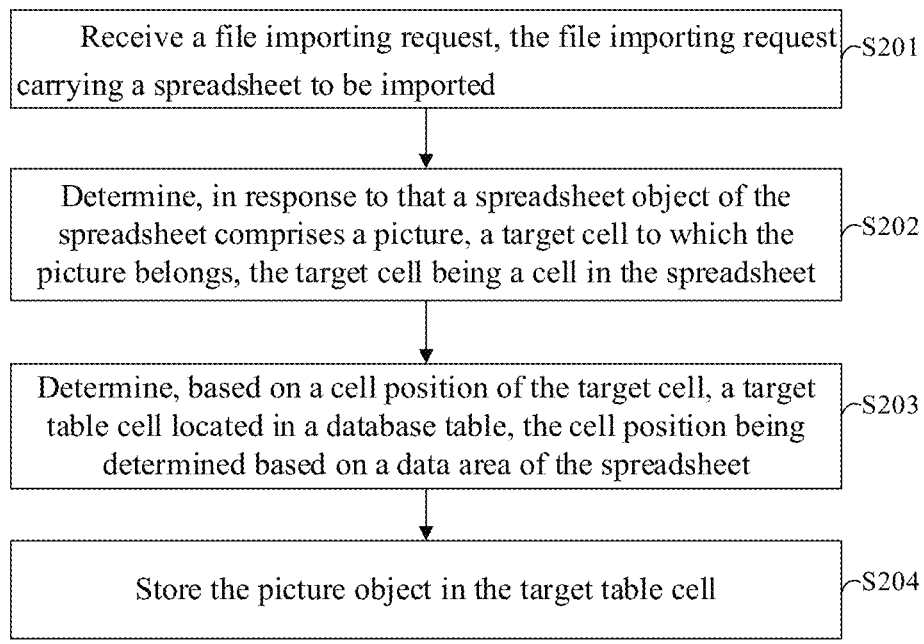
FIG. 15 is a flowchart of yet another method for spreadsheet importing according to an embodiment of the present disclosure.

FIG. 15 is a flowchart of yet another method for spreadsheet importing according to an embodiment of the present disclosure. In practical application, the method for spreadsheet importing can be executed by a server, and the server can be the server 120 in FIG. 1.

Referring to FIG. 15, in the embodiments of the present disclosure, the method for spreadsheet importing includes steps S201-S204.

At S201, a file importing request is received, the file importing request carrying a spreadsheet to be imported.

In the embodiment of the present disclosure, after the electronic device receives the spreadsheet imported by the user, it sends the spreadsheet to the server as a part of the file importing request, and after the server receives the file importing request, the spreadsheet to be imported can be extracted.

In other embodiments of the present disclosure, the electronic device can also be a device receiving the file importing request and processing the file importing request, and in this case, after the electronic device receives the file importing request input by the user, the file importing request is directly processed.

At S202, in response to that a spreadsheet object of the spreadsheet includes a picture, a target cell to which the picture belongs is determined.

In the embodiment of the present disclosure, the spreadsheet object stored in the spreadsheet includes several types: (1) a data object stored in the cell of the spreadsheet, and the data object can be a text, and it can also be numerical data; (2) a picture stored in the spreadsheet in the form of an attachment. When the spreadsheet is displayed, the picture is arranged above the cell in a floating mode. In actual application, in addition to including the picture, the spreadsheet can also store attribute information of the picture, and the attribute information includes position coordinates of the picture and a size of the picture.

As described above, the picture is stored in the spreadsheet in the form of an attachment, not directly stored in the cell of the spreadsheet and arranged above the cell in a floating display mode. However, in practical application, when the user sets the spreadsheet, the picture is identified as cell content.

In order to conform to a setting convention when the spreadsheet is actually established, in the embodiment of the present disclosure, when the spreadsheet is imported into the database table, the picture is not deleted, but the target cell to which the picture belongs is determined. After the target cell to which the picture belongs is determined, how to store the picture in the database table is determined in a subsequent step.

At S203: a target table cell located in a database table is determined based on a cell position of the target cell.

After the target cell corresponding to the picture is determined, then in the embodiment of the present disclosure, the attribute of the target cell is checked, to determine the cell position of the target cell.

In the embodiment of the present disclosure, the cell position of the target cell is a relative position determined according to the data area of the spreadsheet instead of an absolute spreadsheet position of the target cell in the spreadsheet.

For example, if the data area in the spreadsheet starts from the third row and the third column of the spreadsheet, while the target cell is the fourth row and the fourth column of the spreadsheet, then the cell position of the target cell is the second row and the second column according to the data area.

Determining the target table cell located in the database table according to the position of the target cell is to determine which cell of the database is used as the target table cell corresponding to the target cell according to an actual storage condition in the spreadsheet.

For example, in one practical application, the cell position corresponding to the target cell described above is the second row and the second column, and the target table cell is the second row and the second column in the database table.

At S204, the picture is stored in the target table cell.

By adopting the method for spreadsheet importing provided by the embodiment of the present disclosure, when the spreadsheet object in the spreadsheet includes the picture, the picture is displayed in the target table cell of the database table, without causing the picture to be deleted, and the data integrity after the spreadsheet data is imported into the database table can be ensured. In practical application, depending on the number of cells covered by the picture in the spreadsheet, the method for determining the target cell to which the picture belongs in the step S202 may be different, including:

(1) in response to that the picture only covers one cell, the one cell covered by the picture is used as the target cell.

In combination with an actual experience in establishing a spreadsheet such as Excel, it can be known that if a picture is placed in one cell, the picture is mostly the position attribute of the cell and forms a data tuple together with data of other corresponding rows. In this case, the cell covered by the picture can be directly used as the target cell.

(2) in response to that the picture covers a plurality of cells, one cell in the cells covered by the picture is selected as the target cell.

In combination with an actual experience in establishing a spreadsheet such as Excel, it can be known that if a certain picture covers a plurality of cells, the picture is mostly relatively large, whereas a corresponding cell size is relatively small, so in order to avoid an unclear picture caused by reduction of a picture size, the picture covers a plurality of cells. When the picture covers a plurality of cells, a user who establishes the spreadsheet actually only wishes that the picture serves as an element in one cell and forms a data tuple with data of other corresponding rows.

Therefore, in the embodiment of the present disclosure, in response to that the picture covers a plurality of cells, one of the cells covered by the picture is selected as the target cell.

In the embodiment of the present disclosure, when the above (2) is specifically implemented, it can be subdivided into a plurality of sub-conditions:

First sub-condition: in response to that the picture completely covers a plurality of cells, a cell where a reference point of the picture is located is determined as the target cell.

In the embodiment of the present disclosure, the reference point of the picture can be a corner point or a midpoint of the picture, and the corner point can be any one of an upper left corner point, a right lower corner point, a left lower corner point or a right upper corner point. In practical application, the upper left corner point is mostly selected as the reference point.

If the picture completely covers a plurality of cells, in most cases, a user sets the picture according to a reference point set by the user. For example, in most cases, the user sets the picture according to the upper left corner point of the picture, and in this case, the cell where the reference point of the picture is located can be used as the target cell.

Second sub-condition: in response to that the picture does not completely cover a plurality of cells, a cell where the midpoint of the picture is located is determined as the target cell.

In the embodiment of the present disclosure, if the picture does not completely cover a plurality of cells, namely, when the corner point of the picture has position offset relative to a corner point of the cell, the target cell to which the picture belongs cannot be clearly determined according to the corner point of the picture. In this case, the cell where the midpoint of the picture is located is determined first, and then the cell where the midpoint of the picture is located is used as the target cell where the picture is located.

In the case of the second sub-condition, the steps of determining the cell in which the midpoint of the picture is located may be steps S301-S303 as follows.

At S301, a coordinate value of the midpoint of the picture is calculated.

In the embodiment of the present disclosure, the coordinate value of the midpoint of the picture is calculated, and there can be cases as follows: (1) obtaining coordinate values of two opposite corner points in the picture, and calculating an average value according to the coordinate values of the two opposite corner points, as the coordinate value of the midpoint of the picture (in actual application, the two opposite corner points may typically be the upper left corner point and the right lower corner point of the picture); (2) obtaining a coordinate value of one corner point of the picture, and obtaining a length and a width of the picture; and then calculating the coordinate value of the midpoint according to the coordinate value of the one corner point and half of the length and the width.

At S302, based on a proportion of the picture in each of the cells, the coordinate value is rounded to obtain a rounded coordinate value.

In specific application, the proportion of the picture in each cell is determined, and the coordinate value is rounded, which can be performed by rounding a row coordinate and a column coordinate respectively.

In the embodiment of the present disclosure, an abscissa in the coordinate value can be rounded according to proportions of the picture in a left cell and a right cell, and an ordinate in the coordinate value is rounded according to proportions of the picture in an upper cell and a lower cell.

In the embodiment of the present disclosure, a row height and a column width of the cell, and a length and a width of the picture can be expressed by adopting a pound value, and it can also be expressed by adopting an emu unit. In either case, a dimension is an integer dimension.

Figure 16:
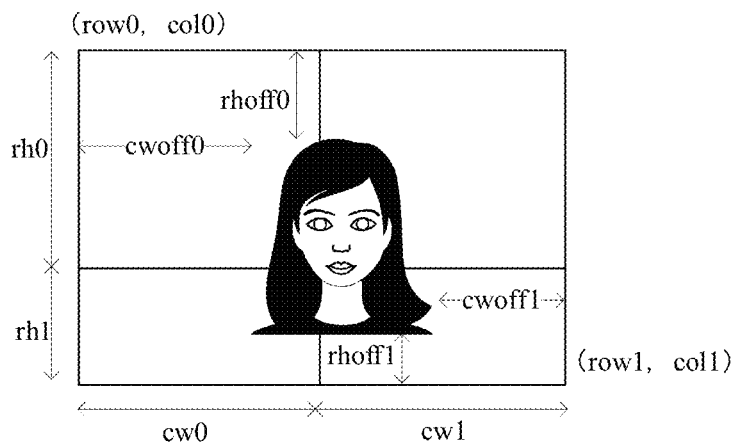
FIG. 16 is a schematic diagram of a position of an electronic object in a spreadsheet according to an embodiment of the present disclosure.

FIG. 16 is a schematic diagram of a position of an electronic object in a spreadsheet according to an embodiment of the present disclosure, in which an abscissa offset of the upper left corner point relative to an upper left corner point of an upper left cell (row 0, col0) is Cwoff0, and an ordinate offset thereof is rhoff0; an abscissa offset of the lower right corner point of the right lower corner point relative to a lower right corner point of a right lower cell (row 1, col1) is cwoff1, and an ordinate offset thereof is rhoff1. A row width of the upper left cell is cw0, and a height thereof is rh0; a row width of the right lower corner point is cw1, and a height thereof is rh1.

According to the figure, a dimension of a picture length direction in two cells on the left side is cw0−cwoff0, and a dimension thereof in two cells on the right side is cw1−cwoff1. If cw0−cwoff0>=cw1−cwoff1, the row coordinate of the midpoint is rounded down; and if cw0−cwoff0<cw1−cwoff1, the row coordinate of the midpoint is rounded up.

A dimension of a picture height direction in two cells on the upper side is rh0−rhoff0, and a dimension thereof in two cells on the lower side is rh1−rhoff1. If rh0−rhoff0>=rh1−rhoff1, the column coordinate of the midpoint is rounded down; and if rh0−rhoff0<rh1−rhoff1, the column coordinate of the midpoint is rounded up.

After the processing above, a rounded coordinate value of the midpoint can be obtained.

At S303, based on the rounded coordinate value, the cell where the midpoint of the picture is located is determined from the plurality of cells covered by the picture.

In the step S303, after the rounded midpoint coordinate value is determined, a cell in which the rounded midpoint coordinate value is located is determined, that is, this cell can be used as the cell where the midpoint of the picture is located.

In this case, the cell in which the midpoint of the picture is located can be used as the target cell.

In the embodiment of the present disclosure, determining the target cell to which the picture belongs can be as follows: determining the cells covered by the picture according to an extensible markup language (XML) in the spreadsheet; and then, determining the target cell in the cells covered by the picture. That is, in various possible implementations in the step 202, the target cell can be determined based on coordinate data or dimension data in the extensible markup language in the spreadsheet.

In the specific application of the embodiment of the present disclosure, the step S203 may specifically include steps S2031 and S2032.

At S2031, the object type of the spreadsheet object stored in the target cell group is determined.

The target cell group is a cell group to which the target cell belongs. In actual application, the target cell group can be a column where the target cell is located or a row where the target cell is located. In the specific application, it is typically the column where the target cell is located.

In some applications, the target cell group stores only the picture. In some other applications, the target cell group not only stores the picture, but also stores the data object, wherein the data object can be a text or numerical data. If importing of the object into the database table continues according to the above rule, the second column in the database table will store the text object and the picture at the same time, thereby causing data attributes of a column of objects to be different.

At S2032, a target table cell located in the spreadsheet database is determined according to the cell position and the object type.

If the target cell group only stores the picture, the target table cell can be determined only according to the cell position. That is, as shown in FIG. 3 and FIG. 4, it is determined that the target table cell is a cell with the row position being 2 and the column position being 2 in the database table.

If the target cell group also stores other objects in addition to storing the picture, in this case, if the picture is directly imported into a cell of which a cell position is the same as that of the target cell, then one column or one row of the database table stores two types of objects at the same time, causing the data attributes of the object in one column or one row to be different.

In order to avoid the above problems, in the embodiment of the present disclosure, when the data of the data area in the spreadsheet is imported into the database table according to the cell position thereof, a column (or a row) is newly created in the database table, and the target table cell is arranged at a target position in the newly added unit group of the database table. For example, as shown in FIG. 13 and FIG. 14, in order to avoid storing the picture in the second column to cause the second column to store the text object and the picture at the same time, in the embodiment of the present disclosure, on the basis of importing 5 rows and 3 columns in the spreadsheet into the database table, a column (i.e., a fourth column) is newly added in the database table, and the picture in the second column and the second column of the spreadsheet is stored in the second row and the fourth column. That is, the target table cell is located in the second row and the fourth column of the database table.

The embodiment of the present disclosure further provides a device for spreadsheet importing in addition to providing the method for spreadsheet importing.

Figure 17:
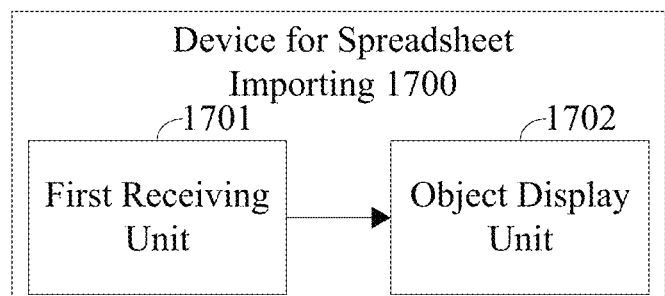
FIG. 17 is a structural schematic diagram of a device for spreadsheet importing according to an embodiment of the present disclosure.

FIG. 17 is a structural schematic diagram of a device for spreadsheet importing provided by an embodiment of the present disclosure. In some embodiments of the present disclosure, the device for electronic device spreadsheet importing may be provided in an electronic device, for example, the electronic device 110 shown in FIG. 1, and the electronic device may be a device having a communication function such as a mobile phone, a tablet computer, a desktop computer, an all-in-one machine, a vehicle-mounted device, and a wearable device.

As shown in FIG. 17, the device for spreadsheet importing 1700 includes a first receiving unit 1701 and an object display unit 1702.

The first receiving unit 1701 is configured to receive a spreadsheet to be imported.

The object display unit 1702 is configured to display, in response to that a spreadsheet object in the spreadsheet includes a picture, the picture in a target table cell of a database table.

The target table cell in the embodiment of the present disclosure is determined according to a cell position of a target cell, whereas the target cell is a cell to which the picture belongs in the spreadsheet. That is, the object display unit 1702 determines the target table cell corresponding to the target cell in the database table based on the cell to which the picture of the spreadsheet belongs, and then displays the picture in a display area defined by the target table cell by the spreadsheet object. By adopting the device for spreadsheet importing 1700 provided by the embodiment of the present disclosure, when the spreadsheet object in the spreadsheet includes the picture, the picture is displayed in the target table cell of the database table, but the picture is not deleted, so that the data integrity after the spreadsheet data is imported into the database table can be ensured.

In some embodiments of the present disclosure, the target table cell is determined according to a position of the target cell relative to the data area.

In some embodiments of the present disclosure, in response to that the target cell is located in the data area, the object display unit 1702 determines that the target table cell is located at the cell position in the database table.

In some embodiments of the present disclosure, in response to that the target cell is located on the left side or the right side of the data area, the object display unit 1702 determines that the target table cell is located at a target row position in a newly added column in the database table, and the target row position is a row position in the cell position.

In some embodiments of the present disclosure, in response to that the target cell is located above or below the data area, the object display unit 1702 determines that the target table cell is located at a target column position in a newly added row in the database table, and the target column position is a column position in the cell position.

In some embodiments of the present disclosure, the object display unit 1702 determines the target table cell according to the cell position of the target cell and the object type of the spreadsheet object stored in the target cell group.

In some embodiments of the present disclosure, the object display unit 1702 determines according to the cell position of the target cell and the object type of the spreadsheet object stored in the target cell group; and the target cell group is a cell group to which the target cell belongs.

Specifically, in response to that the object types in the target cell group are all picture types, the object display unit 1702 determines the target table cell according to the cell position; whereas in response to that the object type of the target cell group includes other object types in addition to the picture type, the object display unit 1702 determines the cell where the target position in the newly added cell group in the database table is located as the target table cell, and the newly added cell group is determined according to the cell group attribute of the target cell group, and the target position is determined according to the cell position.

It should be noted that the device for spreadsheet importing 1700 shown in FIG. 17 may execute each of the steps in the method embodiments shown in FIG. 3 to FIG. 14 and implement various processes and effects in the method embodiments shown in FIG. 2 to FIG. 14, and details are not described herein.

Figure 18:
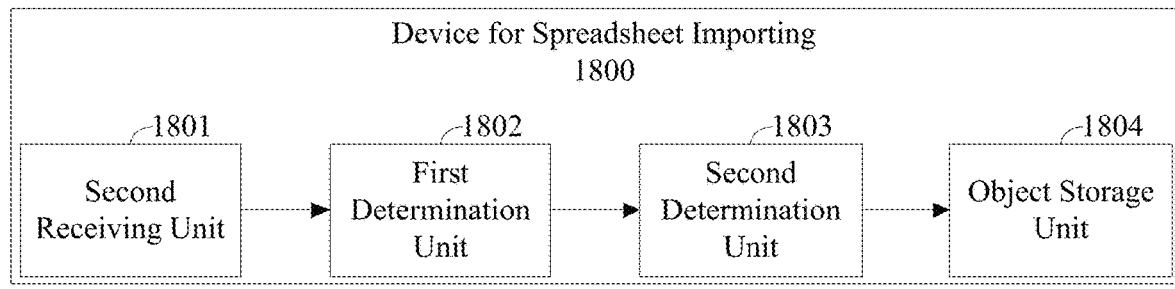
FIG. 18 is a structural schematic diagram of another device for spreadsheet importing according to an embodiment of the present disclosure.

FIG. 18 is a structural schematic diagram of another device for spreadsheet importing according to an embodiment of the present disclosure. In some embodiments of the present disclosure, the device for spreadsheet importing may be disposed in a server, such as the server 120 shown in FIG. 1. The server may be a device having storage and computing functions, such as a cloud server or a server cluster and the like.

As shown in FIG. 18, the device for spreadsheet importing provided by the embodiment of the present disclosure includes a second receiving unit 1801, a first determination unit 1802, a second determination unit 1803 and an object storage unit 1804.

The second receiving unit 1801 is configured to receive a file importing request, the file importing request carrying a spreadsheet to be imported.

The first determination unit 1802 is determine, in response to detecting that a spreadsheet object in the spreadsheet includes a picture, a target cell to which the picture belongs, the target cell being a cell in the spreadsheet.

The second determination unit 1803 is configured to determine a target table cell located in a database table based on a cell position of the target cell, the cell position being determined based on a data area of the spreadsheet.

The object storage unit 1804 is configured to store the picture into the target table cell.

By adopting the device for spreadsheet importing provided by the embodiment of the present disclosure, when the spreadsheet object in the spreadsheet includes the picture, the picture is imported into the target table cell of the database table without causing the picture to be deleted, so that the data integrity after the spreadsheet data is imported into the database table can be ensured.

In some applications of the embodiment of the present disclosure, the first determination unit 1802 is specifically configured to determine the target cell to which the picture belongs based on the number of cells covered by the picture.

In some applications of the embodiments of the present disclosure, in response to that the picture covers one cell, the first determining unit 1802 determines the one cell covered by the picture as the target cell; or in response to that the picture covers a plurality of cells, the first determining unit 1802 selects one cell from the plurality of cells covered by the picture as the target cell.

In some applications of the embodiment of the present disclosure, the first determination unit 1802 is specifically configured to determine a cell where a target point of the picture is located as the target cell, according to a state of coverage of the plurality of cells by the picture.

Specifically, in response to that the picture completely covers the plurality of cells, the first determination unit 1802 determines a cell where a reference point of the picture is located as the target cell; or in response to that the picture does not completely cover the plurality of cells, the first determination unit 1802 determines a cell where a midpoint of the picture is located as the target cell.

In order to take the cell where the midpoint of the picture is located as the target cell in the case that the picture completely covers a plurality of cells, the first determination unit 1802 is further configured to calculate a coordinate value of the midpoint of the picture; round, based on a proportion of the picture in each of the cells, the coordinate value to obtain a rounded coordinate value; and determine, based on the rounded coordinate value, the cell where the midpoint of the picture is located from the plurality of cells covered by the picture.

In some applications of the embodiments of the present disclosure, the first determining unit 1802 determines one or more cells covered by the picture based on an extensible markup language of the spreadsheet; and determines the target cell from the one or more cells covered by the picture.

In some applications of the embodiment of the present disclosure, the first determination unit 1802 determines an object type of a spreadsheet object stored in a target cell group, the target cell group being a cell group to which the target cell belongs; and determines the target table cell in the database table based on the cell position and the object type.

The embodiment of the present disclosure further provides a device for spreadsheet importing, and the device for spreadsheet importing can include a processor and a memory used for storing an instruction that can be executed by the processor. The processor can be used for reading the executable instruction from the memory and executing the instruction to realize the method for spreadsheet importing in the embodiment.

It should be noted that the device for spreadsheet importing shown in FIG. 18 may execute each of the steps in the method embodiments shown in FIG. 3 to FIG. 16 and implement various processes and effects in the method embodiments shown in FIG. 2 to FIG. 16, and details are not described herein.

Figure 19:
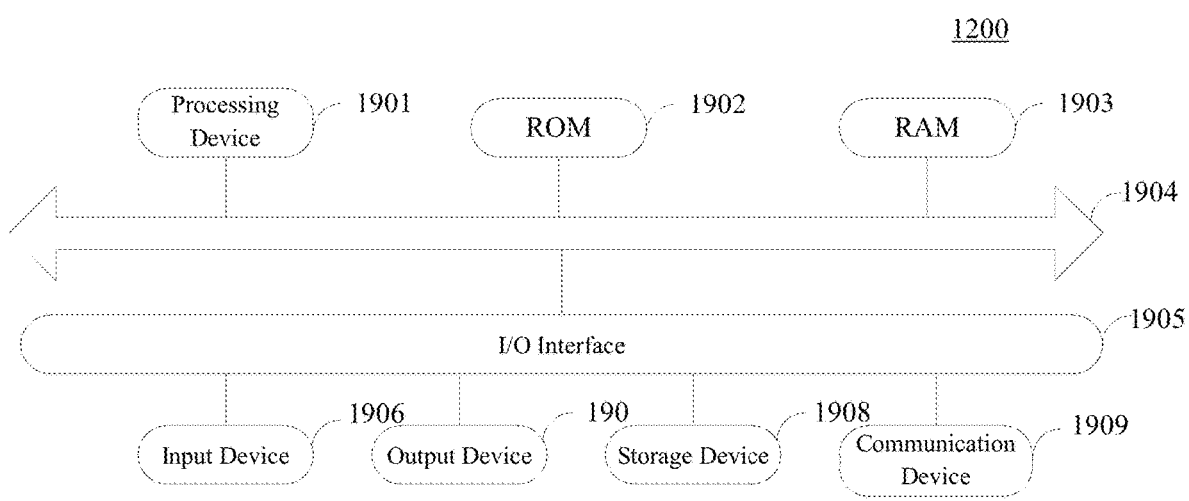
FIG. 19 is a structural schematic diagram of a device for spreadsheet importing according to an embodiment of the present disclosure.

FIG. 19 shows a structural schematic diagram of a device for spreadsheet importing provided by an embodiment of the present disclosure. Specifically, referring to FIG. 19, a structural schematic diagram of a device for spreadsheet importing 1900 suitable for implementing the embodiments of the present disclosure is shown.

The device for spreadsheet importing 1900 in the embodiment of the present disclosure can be an electronic device or a server.

The electronic device may include, but is not limited to, a mobile terminal such as a mobile phone, a notebook computer, a digital broadcast receiver, a PDA (personal digital assistant), a PAD (tablet computer), a PMP (portable multimedia player), a vehicle-mounted terminal (such as a vehicle-mounted navigation terminal), and the like, and a fixed terminal such as a digital TV and a desktop computer. The server can be a device with storage and computing functions, such as a cloud server or a server cluster and the like.

It should be noted that the device for spreadsheet importing 1400 shown in FIG. 19 is merely an example, which should not bring any limitation to the functions and use ranges of the embodiments of the present disclosure.

As shown in FIG. 19, the device for spreadsheet importing 1900 may include a processing device (e.g., a central processor, a graphics processor, etc.) 1901, which may perform various appropriate actions and processes according to a program stored in a read-only memory (ROM) 1902 or a program loaded into a random-access memory (RAM) 1903 from a storage device 1908. In the RAM 1903, various programs and data required for an operation of the device for spreadsheet importing 1900 are also stored. The processing device 1901, the ROM 1902, and the RAM 1903 are connected to each other by a bus 1904. An input/output (I/O) interface 1905 is also connected to the bus 1904.

Generally, following devices may be connected to the I/O interface 1905: an input device 1906 including, for example, a touch screen, a touchpad, a keyboard, a mouse, a camera, a microphone, an accelerometer, a gyroscope, etc.; an output device including, for example, a liquid crystal display (LCD), a speaker, a vibrator, etc.; a storage device 1908 including, for example, tape, hard disk, etc.; and a communication device 1909. The communication device 1909 may allow the device for spreadsheet importing 1900 to perform wireless or wired communication with other device to exchange data. Although FIG. 19 shows the device for spreadsheet importing 1900 having various devices, it is to be understood that it is not required to implement or have all of the illustrated devices. More or fewer devices may alternatively be implemented or provided.

The embodiment of the present disclosure further provides a computer readable storage medium, the storage medium stores a computer program, and the computer program can be used for executing the method for spreadsheet importing in the embodiment.

In particular, according to embodiments of the present disclosure, the process described above with reference to the flowchart may be implemented as a computer software program. For example, the embodiment of the present disclosure includes a computer program product that includes a computer program carried on a non-transitory computer-readable medium, and the computer program includes a program code for executing the method shown in the flowchart. In such embodiments, the computer program may be downloaded and installed from a network via the communication device 1909, or installed from the storage device 1908, or installed from the ROM 1902. When the computer program is executed by the processing device 4101, the function defined in the method for spreadsheet importing of the embodiment of the present disclosure is executed.

It should be noted that the computer readable medium of the present disclosure may be a computer readable signal medium or a computer readable storage medium, or any combination of the two. The computer readable storage medium may be, for example, but not limited to, an electrical, magnetic, optical, electromagnetic, infrared, or semiconductor system, device, or component, or any combination thereof. More specific examples of computer-readable storage media may include, but are not limited to, electrically connected by one or more wires, portable computer disk, hard disk, random access memory (RAM), read-only memory (ROM), erasable programmable read-only memory (EPROM or flash memory), optical fiber, portable compact disk read-only memory (CD-ROM), optical storage component, magnetic storage component, or any suitable combination thereof. In the present disclosure, the computer-readable storage medium may be any tangible medium that includes or stores a program, and the program can be used by or in connection with an instruction execution system, device, or component. While in the present disclosure, the computer-readable signal medium may include a data signal propagated in a baseband or as part of a carrier, and the computer-readable program code is carried therein. Such propagated data signals may take a variety of forms, including, but not limited to, electromagnetic signals, optical signals, or any suitable combination thereof. The computer-readable signal medium may also be any computer-readable medium other than the computer-readable storage medium, and the computer-readable signal medium may send, propagate, or transmit a program used by or in connection with an instruction execution system, device, or component. The program code contained on the computer-readable medium can be transmitted by any suitable medium, including but not limited to, electric wires, optical cables, RF (radio frequency) and the like, or any suitable combination of the above.

In some embodiments, the client, the server may communicate using any currently known or future developed network protocol, such as HTTP (Hypertext Transfer Protocol), and may be interconnected with any form or medium of digital data communication (e.g., communication network). Examples of the communication network include local area networks ("LAN"), wide area networks ("WAN"), Internet networks (e.g., the Internet), and end-to-end networks (e.g., Ad hoc end-to-end networks), as well as any currently known or future developed networks.

The computer readable medium mentioned above can be contained in the device for spreadsheet importing; and it can also exist alone and is not assembled into the device for spreadsheet importing.

The computer readable medium carries one or more programs, and when the one or more programs are executed by the device for spreadsheet importing, the device for spreadsheet importing is caused to:

receive a spreadsheet to be imported; and display, in response to that a spreadsheet object in the spreadsheet includes a picture, the picture in a target table cell of a database table, wherein the target table cell is determined based on a cell position of a target cell; the target cell is a cell to which the picture belongs in the spreadsheet; and the cell position is determined based on a data area of the spreadsheet, or receive a file importing request, the file importing request carrying a spreadsheet to be imported; determine, in response to that a spreadsheet object of the spreadsheet includes a picture, a target cell to which the picture belongs, the target cell being a cell in the spreadsheet; determine, based on a cell position of the target cell, a target table cell located in a database table, the cell position being determined based on a data area of the spreadsheet; and store the picture in the target table cell.

In an embodiment of the present disclosure, a computer program code for executing an operation of the present disclosure may be written in one or more programming languages, and the programming languages include, but not limited to, object-oriented programming languages, such as Java, Smalltalk, C++, and conventional procedural programming languages, such as "C" languages or similar programming languages. The program code may be executed entirely on the user's computer, executed partly on the user's computer, executed as a stand-alone software package, executed partly on the user's computer and partly on a remote computer, or executed entirely on the remote computer or server. In the case of the remote computer, the remote computer may be connected to the user computer through any type of network, including a local area network (LAN) or a wide area network (WAN), or it may be connected to an external computer (e.g., via the Internet using an Internet Service Provider)).

The flowcharts and block diagrams in the company drawings illustrate the architecture, functionality, and operation of possible implementations of systems, methods, and computer program products in accordance with various embodiments of the present disclosure. In this regard, each block in the flowcharts or block diagrams may represent a module, a program segment, or a portion of the code, and the module, the program segment, or the portion of the code include one or more executable instructions for implementing a specified logical function. It should also be noted that, in some alternative implementations, functions noted in the block may occur out of the order noted in the drawings. For example, two blocks represented in succession may, in fact, be executed substantially in parallel, and they may sometimes be executed in a reverse order, depending upon functions involved. It is also noted that each block of the block diagrams and/or flowcharts, and combinations of blocks in the block diagrams and/or flowcharts, may be implemented with an application-specific hardware-based system that executes specified functions or operations, or may be implemented with a combination of application-specific hardware and computer instructions.

The units involved in the embodiments of the present disclosure may be implemented by means of software or may be implemented by means of hardware. A name of the unit does not constitute a limitation on the unit itself in some cases.

The functions described herein may be executed at least in part by one or more hardware logic components. For example, non-limiting, exemplary types of the hardware logic components that may be used include: a field programmable gate array (FPGA), an application specific integrated circuit (ASIC), an application specific standard par (ASSP), an on-chip system (SOC), a complex programmable logic device (CPLD), and the like.

In the context of the present disclosure, a machine-readable medium may be a tangible medium that may contain or store a program used by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor system, device, or apparatus, or any suitable combination of the foregoing. More specific examples of a machine-readable storage medium may include electrically connected by one or more wires, portable computer disk, hard disk, random access memory (RAM), read-only memory (ROM), erasable programmable read-only memory (EPROM or flash memory), optical fiber, portable compact disk read-only memory (CD-ROM), optical storage component, magnetic storage component, or any suitable combination thereof.

The above description is merely a description of the preferred embodiments of the present disclosure and the technical principles used. It should be understood by those skilled in the art that the scope of disclosure involved in the present disclosure is not limited to the technical solution formed by a specific combination of the above-mentioned technical features, and it also covers other technical solutions formed by any combination of the above-mentioned technical features or equivalent features thereof without departing from the disclosed concept. For example, the above-mentioned features and the technical features disclosed in the present disclosure (but not limited to) having similar functions are replaced with each other.

Further, while various operations are depicted in a particular order, it should not be understood that these operations are required to be executed in the particular order shown or in sequential order. Multitasking and parallel processing may be advantageous in a certain environment. Likewise, although several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in various embodiments separately or in any suitable sub-combination.

Although the subject matter has been described in language specific to structural features and/or methodological acts, it should be understood that the subject matter defined in the appended claims is not necessarily limited to the particular features or acts described above. Rather, the specific features and acts described above are merely exemplary forms of implementing the claims.

What is claimed is:

1. A method for spreadsheet importing, applied to an electronic device, the method comprising:
   receiving, by the electronic device, a spreadsheet to be imported; and
   displaying, by the electronic device in response to that a spreadsheet object in the spreadsheet comprises a picture, the picture in a target table cell of a database table,
   wherein the target table cell is determined based on a cell position of a target cell; the target cell is a cell to which the picture belongs in the spreadsheet; and the cell position is determined based on a data area of the spreadsheet,
   wherein said target table cell being determined based on the cell position of the target cell comprises:
   the target table cell being determined based on a position of the target cell relative to the data area,
   wherein said target table cell being determined based on the position of the target cell relative to the data area comprises:
   in response to that the target cell is located on a left side or a right side of the data area, the target table cell being located at a target row position in a newly added column in the database table, and the target row position being a row position in the cell position; and
   in response to that the target cell is located above or below the data area, the target table cell being located at a target column position in a newly added row in the database table, and the target column position being a column position in the cell position.

2. The method according to claim 1, wherein said target table cell being determined based on the position of the target cell relative to the data area comprises:
   in response to that the target cell is located in the data area, the target table cell being located at the cell position in the database table.

3. The method according to claim 1, wherein said target table cell being determined based on the cell position of the target cell comprises:
   the target table cell being determined based on the cell position of the target cell and an object type of a spreadsheet object stored in a target cell group,
   wherein the target cell group is a cell group to which the target cell belongs.

4. The method according to claim 3, wherein in response to that the object type is a picture type, the target table cell is determined based on the cell position.

5. The method according to claim 3, wherein in response to that the object type comprises another object type in addition to a picture type, the target table cell is located at a target position in a newly added cell group in the database table,
   wherein the newly added cell group is determined based on a cell group attribute of the target cell group, the target position being determined based on the cell position.

6. A computer readable storage medium, wherein the storage medium has a computer program stored thereon, and when the computer program is executed by a processor, the processor is caused to implement the method for spreadsheet importing according to claim 1.

7. A method for spreadsheet importing, applied to a server, the method comprising:
   receiving, by the server, a file importing request, the file importing request carrying a spreadsheet to be imported;
   determining, by the server in response to that a spreadsheet object of the spreadsheet comprises a picture, a target cell to which the picture belongs, the target cell being a cell in the spreadsheet;
   determining, by the server based on a cell position of the target cell, a target table cell located in a database table, the cell position being determined based on a data area of the spreadsheet; and
   storing, by the server, the picture in the target table cell,
   wherein said determining, by the server, the target cell to which the picture belongs comprises:
   determining, by the server, the target cell to which the picture belongs based on the number of cells covered by the picture,
   wherein said determining, by the server, the target cell to which the picture belongs based on the number of the cells covered by the picture comprises:
   determining, by the server, in response to that the picture covers one cell, the one cell covered by the picture as the target cell; and
   selecting, by the server, in response to that the picture covers a plurality of cells, one cell from the plurality of cells covered by the picture as the target cell,
   wherein said selecting, by the server, the one cell from the plurality of cell covered by the picture as the target cell comprises:
   determining, by the server, a cell where a target point of the picture is located as the target cell, according to a state of coverage of the plurality of cells by the picture,
   wherein said determining, by the server, the cell where the target point of the picture is located as the target cell according to the state of coverage of the plurality of cells by the picture comprises:

determining, by the server, in response to that the picture completely covers the plurality of cells, a cell where a reference point of the picture is located as the target cell; and determining, by the server, in response to that the picture does not completely cover the plurality of cells, a cell where a midpoint of the picture is located as the target cell, wherein, prior to determining, by the server, the cell where the midpoint of the picture is located as the target cell, the method further comprises:

calculating, by the server, a coordinate value of the midpoint of the picture;

rounding, by the server, based on a proportion of the picture in each of the cells, the coordinate value to obtain a rounded coordinate value; and determining, by the server, based on the rounded coordinate value, the cell where the midpoint of the picture is located from the plurality of cells covered by the picture.

8. The method according to claim 7, wherein said determining, by the server, the target cell to which the picture belongs comprises:

determining, by the server, one or more cells covered by the picture based on an extensible markup language of the spreadsheet; and determining, by the server, the target cell from the one or more cells covered by the picture.

9. The method according to claim 7, wherein said determining, by the server, the target table cell located in the database table based on the cell position of the target cell comprises:

determining, by the server, an object type of a spreadsheet object stored in a target cell group, the target cell group being a cell group to which the target cell belongs; and determining, by the server, the target table cell in the database table based on the cell position and the object type.

10. A device for spreadsheet importing, comprising:

a processor;

a memory having an executable instruction stored thereon, wherein the processor is configured to read the executable instruction from the memory and execute the executable instruction to implement the method for spreadsheet importing according to claim 7.

11. A computer readable storage medium, wherein the storage medium has a computer program stored thereon, and when the computer program is executed by a processor, the processor is caused to implement the method for spreadsheet importing according to claim 7.

12. A device for spreadsheet importing, comprising:

a processor;

a memory having an executable instruction stored thereon, wherein the processor is configured to read the executable instruction from the memory and execute the executable instruction to:

receive a spreadsheet to be imported; and display, in response to that a spreadsheet object in the spreadsheet comprises a picture, the picture in a target table cell of a database table, wherein the target table cell is determined based on a cell position of a target cell; the target cell is a cell to which the picture belongs in the spreadsheet; and the cell position is determined based on a data area of the spreadsheet, wherein said target table cell being determined based on the cell position of the target cell comprises:

the target table cell being determined based on a position of the target cell relative to the data area, wherein said target table cell being determined based on the position of the target cell relative to the data area comprises:

in response to that the target cell is located on a left side or a right side of the data area, the target table cell being located at a target row position in a newly added column in the database table, and the target row position being a row position in the cell position; and in response to that the target cell is located above or below the data area, the target table cell being located at a target column position in a newly added row in the database table, and the target column position being a column position in the cell position.

* * * * *